United States Patent
Robinson et al.

(10) Patent No.: US 7,021,532 B2
(45) Date of Patent: Apr. 4, 2006

(54) TRANSACTION AUTHORIZATION SYSTEM AND METHOD

(75) Inventors: Mark E. Robinson, Peoria, AZ (US); Greg D. Garrison, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/709,859

(22) Filed: Jun. 2, 2004

(65) Prior Publication Data

US 2005/0269398 A1    Dec. 8, 2005

(51) Int. Cl.
*G06K 5/00* (2006.01)

(52) U.S. Cl. .............. 235/380; 705/35; 705/41
(58) Field of Classification Search .......... 235/380, 235/375–379; 705/34–41, 79
See application file for complete search history.

(56) References Cited

U.S. PATENT DOCUMENTS

| | | | |
|---|---|---|---|
| 5,115,392 A | 5/1992 | Takamoto et al. | |
| 5,220,593 A * | 6/1993 | Zicker et al. | 455/407 |
| 5,257,371 A | 10/1993 | Anezaki | |
| 5,285,382 A | 2/1994 | Muehlberger et al. | |
| 5,291,595 A | 3/1994 | Martins | |
| 5,331,546 A | 7/1994 | Webber et al. | |
| 5,404,291 A | 4/1995 | Kerr et al. | |
| 5,457,305 A * | 10/1995 | Akel et al. | 705/45 |
| 5,535,407 A | 7/1996 | Yanagawa et al. | |
| 5,570,283 A | 10/1996 | Shoolery et al. | |
| 5,648,900 A | 7/1997 | Bowen et al. | |
| 5,652,867 A | 7/1997 | Barlow et al. | |
| 5,668,993 A | 9/1997 | Peters et al. | |
| 5,764,981 A | 6/1998 | Brice et al. | |
| 5,832,452 A | 11/1998 | Schneider et al. | |
| 5,832,453 A | 11/1998 | OBrien | |
| 5,852,812 A * | 12/1998 | Reeder | 705/39 |
| 5,864,818 A | 1/1999 | Feldman | |
| 5,870,722 A | 2/1999 | Albert et al. | |
| 5,884,288 A * | 3/1999 | Chang et al. | 705/40 |
| 5,940,813 A | 8/1999 | Hutchings | |
| 5,974,146 A | 10/1999 | Randle et al. | |
| 5,999,916 A | 12/1999 | Peters et al. | |
| 6,023,679 A | 2/2000 | Acebo et al. | |
| 6,085,164 A | 7/2000 | Smith et al. | |
| 6,119,094 A | 9/2000 | Lynch et al. | |
| 6,119,934 A | 9/2000 | Kolls | |
| 6,122,642 A | 9/2000 | Mehovic | |
| 6,128,602 A | 10/2000 | Northington et al. | |
| 6,229,534 B1 | 5/2001 | Gerra et al. | |
| 6,275,808 B1 | 8/2001 | DeMarcken | |
| 6,295,551 B1 * | 9/2001 | Roberts et al. | 709/205 |
| 6,356,928 B1 | 3/2002 | Rochkind | |
| 6,389,473 B1 | 5/2002 | Carmel et al. | |
| 6,442,526 B1 | 8/2002 | Vance et al. | |

(Continued)

*Primary Examiner*—Karl D. Frech
*Assistant Examiner*—Edwyn Labaze
(74) *Attorney, Agent, or Firm*—Snell & Wilmer L.L.P.

(57) ABSTRACT

The present invention includes a system and method for authorizing billing files at a substantially real-time batch authorization rate. The invention comprises a poller configured for queuing billing transaction files in real-time. In one embodiment, the invention uses advanced logic to split transactions into multiple subsets and it uses a plurality of different sized data streams to facilitate processing transactions. A card authorization system is used to process the transaction subsets. The card authorization may have one or more sockets to facilitate processing different-sized data streams. In another embodiment, the invention uses a merger to reconstruct the subsets into a billing transaction file.

17 Claims, 5 Drawing Sheets

U.S. PATENT DOCUMENTS

| | | |
|---|---|---|
| 6,480,876 B1 | 11/2002 | Rehg et al. |
| 6,574,600 B1 | 6/2003 | Fishman et al. |
| 6,578,015 B1 * | 6/2003 | Haseltine et al. ............. 705/34 |
| 6,594,647 B1 | 7/2003 | Randle et al. |
| 6,609,098 B1 | 8/2003 | DeMarcken |
| 2001/0034720 A1 * | 10/2001 | Armes ......................... 705/65 |
| 2002/0107794 A1 * | 8/2002 | Furphy et al. ................ 705/40 |
| 2002/0161814 A1 | 10/2002 | Wical |
| 2003/0028481 A1 * | 2/2003 | Flitcroft et al. ................ 705/39 |
| 2003/0041025 A1 * | 2/2003 | Bonalle et al. ................ 705/39 |
| 2003/0167231 A1 | 9/2003 | Winking et al. |
| 2003/0200182 A1 * | 10/2003 | Truitt et al. ................... 705/75 |
| 2003/0210663 A1 | 11/2003 | Everson et al. |
| 2004/0037561 A1 | 2/2004 | Guild et al. |
| 2004/0088380 A1 | 5/2004 | Chung et al. |
| 2004/0158532 A1 * | 8/2004 | Breck et al. .................. 705/74 |

* cited by examiner

TRANSACTION AUTHORIZATION SYSTEM AND METHOD

FIELD OF INVENTION

This application generally relates to transaction account authorizations, and more particularly, to an improved system and method for facilitating efficient authorizations for billing transactions.

BACKGROUND OF INVENTION

Many transaction card companies use batch processing to authorize transactions. However, such batch authorizations are typically not "real time", and thus, authorizing a large number of transactions is often secondary priority to real-time authorizations. As such, transaction card companies are usually not able to guarantee processing of transactions at sufficiently fast rates.

Insufficient processing speed is common with billing processing, wherein a merchant (e.g., a utility company) may send one or more files to a transaction card company for authorization multiple times over a certain time period. Each of the files may each contain over 50,000 different billing transactions that need authorization. The turn-around time for authorizing these large transaction files may easily exceed four hours, but such long turn-around times are often undesirable and inconvenient. Accordingly, a longstanding need exists for increasing the speed of billing transaction authorizations.

SUMMARY OF INVENTION

The present invention includes an Automatic Bill Payment Platform (ABPP) for processing billing transactions. The system receives files from one or more merchants, and then authorizes the files at a substantially real-time batch authorization rate. In one embodiment, the system comprises a poller configured for queuing a billing transaction file in real-time. In another embodiment, the system uses advanced logic to split transactions into multiple subsets to expedite processing. In another embodiment, the system uses a plurality of different sized data streams to facilitate processing transactions. The data streams may be configured to use a card authorization system with one or more sockets to facilitate processing of the transactions. In another embodiment, the system uses a merger to reconstruct the subsets into a billing transaction file.

The present invention also includes a method for authorizing billing transactions. The method includes queuing billing transaction files, splitting the transaction files, and transferring the files through at least one socket to a card authorization system. The method also includes authorizing and reconstructing the subsets.

BRIEF DESCRIPTION OF DRAWINGS

A more complete understanding of the present invention may be derived by referring to the detailed description and claims when considered in connection with the figures, where like reference numbers refer to similar elements throughout the figures, and:

DETAILED DESCRIPTION

Figure 1:
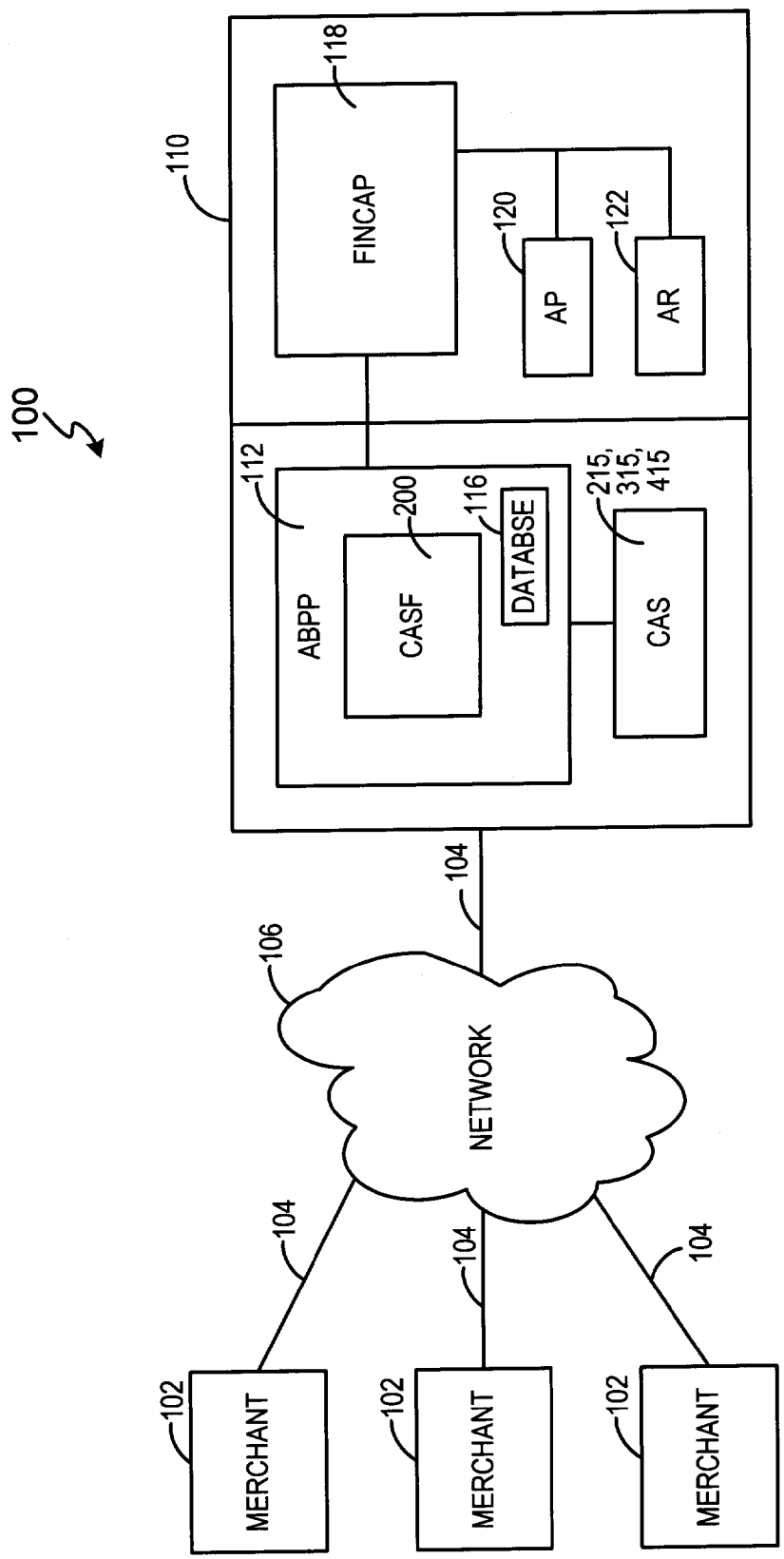
FIG. 1 includes a block diagram illustrating an exemplary authorization system.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system computing components discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, the computing systems may include an operating system (e.g., Windows NT, 95/98/2000, OS2, UNIX, MVS, TPF, Linux, Solaris, MacOS, etc.) as well as various conventional support software and drivers typically associated with computers.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions.

It should be further understood that, by giving value, a customer may be engaging in a transaction with a merchant. The term "transaction" not only contemplates an exchange of goods or services for value from one party to another, but also the gifting of any item which may or may not include value from a customer to a merchant. Additionally, transaction or transaction card numbers may include account numbers that are used to facilitate any type of transaction.

An "account" or "account number", as used herein, may include any device, code, number, letter, symbol, digital certificate, smart chip, digital signal, analog signal, biometric or other identifier/indicia suitably configured to allow the user to access, interact with or communicate with the system such as, for example, one or more of an authorization/access code, personal identification number (PIN), Internet code, other identification code, and/or the like, which may optionally be located on or associated with a rewards card, charge card, credit card, debit card, prepaid card, telephone card, smart card, magnetic stripe card, bar code card, transponder, radio frequency card or an associated account. The account number may be distributed and stored in any form of plastic, electronic, magnetic, radio frequency, wireless, audio and/or optical device capable of transmitting or downloading data from itself to a second device. An account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the cardholder. A merchant account number may be, for example, any number or alpha-numeric characters that identifies a particular charity for purposes of card acceptance, account reconciliation, reporting, or the like.

Furthermore, the merchant and the provider, described herein, may represent individual people, entities, or business, and while reference is made to American Express®, or any other credit card provider, this is by way of example and the financial authorization entity may represent various types of card issuing institutions, such as banks, credit card companies, card sponsoring companies, or third-party issuers under contract with financial institutions. The payment network may include existing proprietary networks that presently accommodate transactions for credit cards, debit cards, and other types of financial/banking cards, such as, for example, the American Express®, and VisaNet® network.

While the terms "credit card accounts" or "credit card" may be used in the exemplary embodiments, the invention contemplates the use of any type of financial or transaction account. As used herein, a "transaction card" may include any account used for financial and/or value transactions wherein the account may or may not be associated with a physical card, such as a charge card, credit card, debit card, smart card, bar-coded card, magnetic stripe card, account number, internet account, internet card, personal digital assistant account, digital wallet account, airline card, mall card, frequent shopper card, brokerage account, 401K plan, stock account, telephone account, utility account, loyalty point account, and/or the like. One such transaction account, which is suitable for use with this invention, is the account described by Bishop et al., in the U.S. patent application Ser.

No. 09/652,899, entitled "Methods and Apparatus for Conducting Electronic Transactions," filed Aug. 31, 2000, which is herein incorporated in its entirety by reference.

As used herein, network 106 may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols" (1998); "Java 2 Complete," various authors, (Sybex 1999); Deborah Ray and Eric Ray, "Mastering HTML 4.0" (1997); and Loshin, "TCP/IP Clearly Explained" (1997), the contents of which are hereby incorporated by reference.

FIG. 1 is a block diagram of an exemplary Automated Bill Payment Platform (ABPP) system 100 in accordance with this invention. With reference to FIG. 1, in general, one or more merchant systems 102 communicate with a transaction engine 110 via a network 106 to send and/or receive database files containing information related to individual customer credit card accounts. In an exemplary embodiment, transaction engine 110 suitably maintains distinct data file groupings for each individual merchant system 102 and retrieves the distinct data files to perform updating as requested by merchant systems 102.

Transaction engine 110 may be configured to contain any hardware, software, one or more servers and/or platforms for processing transactions. For example, the present invention anticipates use of an Automated Bill Payment Platform (ABPP) 112 configured to facilitate processing billing transactions. ABPP 112 may be configured to receive recurring files from merchant 102 via network 106. ABPP may also be configured to use Card Authorization System Function (CASF) 200, 300, 400 and/or Card Authorization System (CAS) 215, 315, 415 to facilitate authorization of the billing files. CASF 200, 300, 400 and Card Authorization System (CAS) 215, 315, 415 will be described in detail herein with respect to FIG'S. 2–4.

Upon authorization, ABPP 112 may be configured to submit the authorized charges to financial capture (FINCAP) 118 for further processing. FINCAP 118, Accounts Payable (AP) 120 and Accounts Receivable (AR) 122 represent any suitable software and/or hardware employed by transaction card companies like American Express® and other card acquirers or card issuers which are configured to authorize merchant transaction requests and process settlement requests. While FIG. 1 depicts these systems in a single transaction engine, it should be appreciated that these systems may take various forms and/or reside on multiple transaction engines depending on the particular engine or groups of engines.

For example, FINCAP 118 may be configured to receive billing authorization from ABPP 112. FINCAP 118 may then be configured to send a payment file to AP 120 to pay merchant 102. FINCAP 118 may also retrieve the appropriate cardholder account information and send a billing file to AR 122. AR 122 may be configured to generate a billing statement to provide a cardmember or a cardmember's financial transaction institution reflecting the appropriate billing information.

Merchant system 102 may include any suitable hardware and/or software described herein configured to allow a merchant to accept a transaction account payment and communicate over network 106. For example, merchant system 102 may include a standard personal computer (PC) comprising a CPU, monitor, storage, keyboard, mouse, and communication hardware appropriate for the given data link 104 (e.g., V.90 modem, network card, cable modem, etc.). In alternate embodiments, merchant system 102 is a personal data assistant (PDA) capable of manipulating images and communicating with transaction engine 110. Merchant system 102 may also include application software configured to communicate over network 106 with transaction engine 110, for example, a world wide web (WWW) browser or any other communication software. In an exemplary embodiment, merchant system 102 includes point-of-sale terminal which communicates over a payment network discussed herein or via a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Merchant system 102 and transaction engine 110 are suitably coupled to network 106 via data links 104. A variety of conventional communications media and protocols may be used for data links 104. Such links may include, for example, a connection to an Internet Service Provider (ISP) over the local loop as is typically used in connection with standard modem communication, cable modem, Dish networks, ISDN, Digital Subscriber Line (DSL), or various wireless communication methods. Merchant system 102 may also reside within a LAN that interfaces to network 106 via a leased line (T1, D3, etc.). Such communication methods are well known in the art, and are covered in a variety of standard texts. See, e.g., Gilbert Held, "Understanding Data Communications" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Transaction engine 110 comprises any suitable hardware and/or software, along with any networking components suitable to provide a user interface to a network that is accessible by users, and which provides the functionality described in further detail below. In one embodiment, Sun Ultra SPARC Enterprise 250 and 450 servers are used in conjunction with a Sun Solaris 7 or Linux operating system, Apache web server software, and an Oracle 8 or MySQL database system. Of course particular hardware and software components used in transaction engine 110 will vary widely from embodiment to embodiment. Furthermore, transaction engine 110 may represent a "cluster" or group of separate computer systems providing the functionalities described herein. In one embodiment, a transaction card company with which the merchant has established a billing account manages transaction engine 110. The billing account may be associated with any suitable transaction card service such as Visa®, MasterCard®, American Express®, Discover®, or the like. Further, the billing account may additionally allow the merchant to recover payment for charges made through the merchant by an individual customer who is a subscriber of the credit card service. It should be noted that although the present invention is described with relation to a transaction card service, the invention is not so limited. That is, the invention is suitable for use with any system wherein the customer is billed on a periodic basis.

The merchant database locations maintained on database 116 by transaction engine 110 may be provided a distinct merchant identifier. Database 116 may be maintained on a local drive of transaction engine 110 or on a separate computer coupled to transaction engine 110 via a local area or other network (not shown). In one embodiment, database 116 is a collection of ASCII or other text files stored on a local drive of transaction engine 110. Merchant database information is suitably retrieved from database 116 and provided to merchant systems 102 upon request via a server application, as described more fully below.

Various databases used herein may include, for example, merchant data, financial institution data, and/or like data useful in the operation of the present invention. In other embodiments, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that is stored using different data storage formats and/or techniques. Further, each data set may contain subsets of data that also may be distinct from other subsets.

As stated above, in various embodiments of the present invention, the data may be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations is further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, charity, issuer, donor or the like. Furthermore, the security information may restrict/permit only certain actions such as accessing, modifying, and/or deleting data sets. In one example, the data set annotation indicates that only the data set owner or the donor are permitted to delete a data set, various identified charities are permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one preferred embodiment, the header or trailer is not stored on the transaction device along with the associated issuer-owned data but instead the appropriate action may be taken by providing to the transaction instrument user at the stand-alone device, the appropriate option for the action to be taken. However, the present invention contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that may be used to interact with the user. For example, a typical website may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a browser that includes a URL (http://yahoo.com/stockquotes/ge) and an IP address (123.56.789). The web service retrieves the appropriate web pages and sends the web pages to the IP address.

Within each merchant database location on database 116, a plurality of individual data locations corresponding to the charge card accounts of cardholders who have elected to enroll in the merchant's recurrent billing program may be stored. For example, a merchant may have a plurality of American Express® cardmembers who have elected to subscribe to the merchant's recurrent billing program. Where American Express® manages the charge card transaction engine 110, American Express® establishes a unique database location on database 116, which houses current information related to the merchant's recurrent billing customers (e.g., merchant assigned customer number, credit card number and expiration date) who are using American Express for recurrent billings. The database location may be assigned an identifier that can be recognized as belonging to a particular merchant. However, to facilitate American Express® maintaining a database location for a particular merchant, the merchant database information (e.g., customer number, credit card number and expiration date) is first provided to the database 116. That is, in an exemplary embodiment, a merchant performs an "initial registry" process for providing the information to the charge card provider.

As used herein, the term "user", "end user", "consumer", "customer", and "cardmember", may be used interchangeably with each other, and each shall mean any person, entity, machine, hardware, or software. A bank may be part of the system, but the bank may represent other types of card issuing institutions, such as credit card companies, card sponsoring companies, or third-party issuers under contract with financial institutions.

Figure 2:
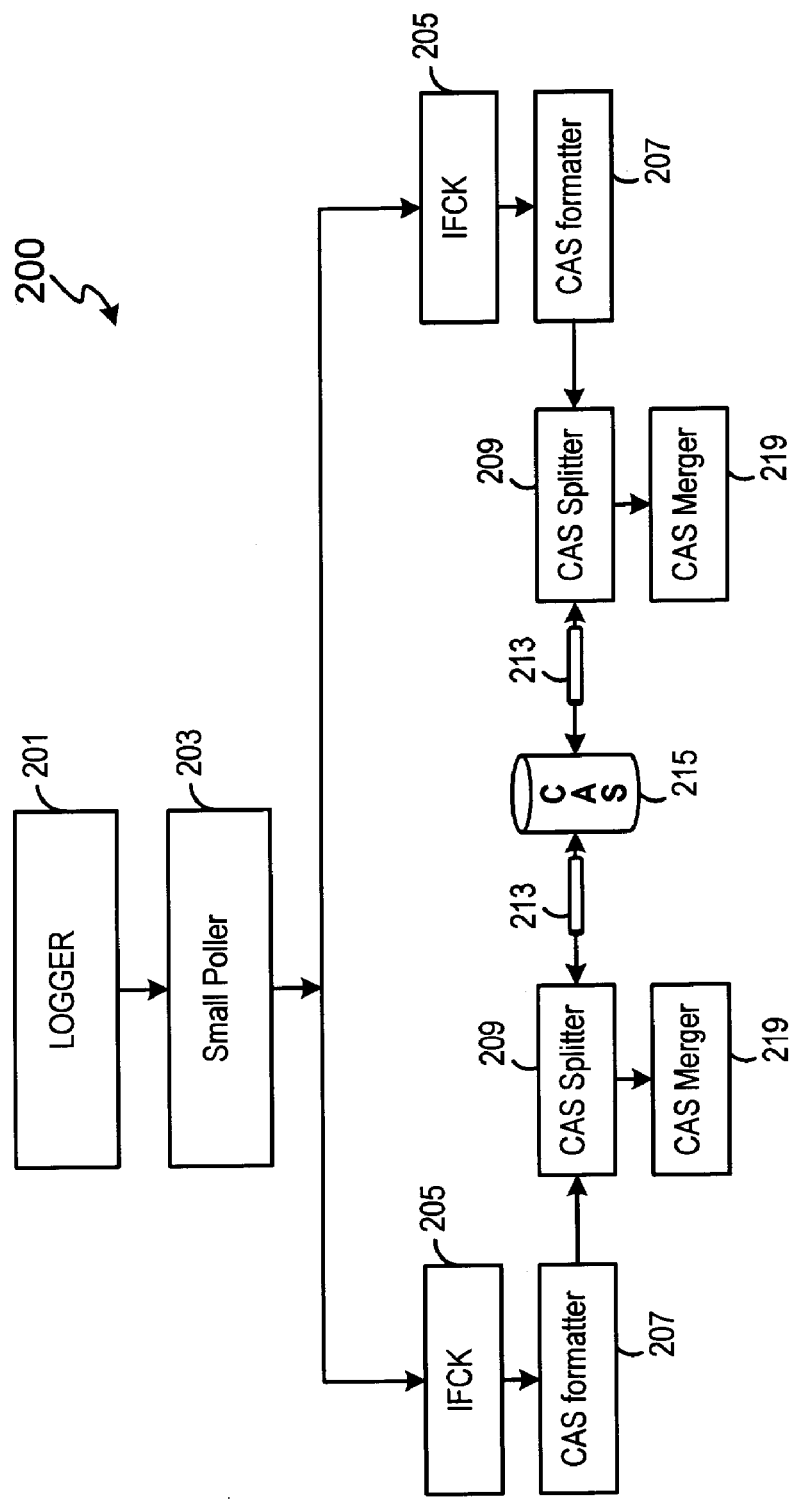
FIG. 2 includes a block diagram illustrating an exemplary authorization system for processing small file streams.

ABPP 112 may use CASF 200, 300, 400 to facilitate authorization of transaction file streams. In accordance with an exemplary embodiment, small CASF 200 is illustrated in FIG. 2. Small CASF 200 may be configured with at least one of a logger 201 and/or a small poller 203 to facilitate directing small file streams into CASF 200. Small CASF 200 may also be configured with at least one of an Initial File Check (IFCK) 205, CAS formatter 207, and/or CAS splitter 209 to facilitate editing, formatting and/or division of transaction files. Small CASF 200 may be configured with one or more sockets 213. Socket 213a and/or socket 213b may direct transactions to CAS 215 for authorization. Small CASF 200 may also be configured with a CAS Merger 219. CAS merger 219 may be used to facilitate reconstruction of authorized transaction files. These CASF 200 configurations will be described in detail herein.

Small CASF 200 may be configured to provide substantially real-time batch authorizations for billing for small transaction file streams. By the term "real-time," authorizations may be within some small upper limit of response time. Real-time processing differs from batch processing in that batch processing queues transaction files for processes once resources become available. Real-time authorizations may increase overall processing time, efficiencies, and/or billing transaction capacity.

The phrase "small transaction file streams," as used herein, refers to the number of files in a merchant transaction request. For example, if a merchant transmits a file of less than 1000 transactions for billing payment authorization into ABPP 112, this transaction set may constitute a small transaction file stream. If a merchant transmits a file of 1000 to 49,999 transactions, this may constitute a medium transaction file stream. If a merchant transmits a file of 50,000 or more transaction, this may constitute a large file stream. The size of the file stream may be used to determine the CASF 200, 300, 400 system used to authorize transactions in a file.

Small CASF 200 may be configured with two single-socket 213 systems for queuing one or more transaction files for processing in Card Authorization Systems (CAS) 215. Transactions may enter small CASF 200 through the logger 201 and small poller 203. Logger 201 may be any hardware and/or software configured to track transaction files and ensure that the corresponding sized CASF 200 processes them. By the term process, CASFs 200, 300, 400 may facilitate authorization, computing, comparing, verifying, transmitting, running, and/or any other type of processing of a file. For example, logger 201 may be configured to ensure that CASF 200 processes transaction files containing 999 transactions or less. Small poller 203 may be any hardware and/or software suitably configured to direct one or more transaction files into the first-available CAS 215 within CASF 200 to facilitate real-time authorizations of the files. For example, if three small files arrive through logger 201 simultaneously, small poller 203 may be configured to direct two of the files to CAS 215 through socket 213a and/or socket 215b. If the file processing through socket 213b finishes processing before the file processing through socket 213a, small poller 203 may direct the third transaction file to CAS 215 through socket 213a to facilitate immediate processing of the third file.

Logger 201 and/or small poller 203 may also be configured to store factual reference information about each CAS 215 and/or CAS sockets 213. CAS sockets 213 may be any mechanisms for creating a virtual connection between processes. CAS sockets 213 may be stream (bi-directional) and/or datagram (fixed length destination-addressed messages) sockets. CAS sockets 213 may also be configured with socket addresses, consisting of a port number and a local host's network address. CAS sockets 213 may be configured to create a communications end-point and/or return a file descriptor with which to access the sockets.

Logger 201 and/or small poller 203 may be configured to store information relating to the various CASF 200, 300, 400 systems and current thread system processing information. As used herein, the term "thread," refers to a part of a larger program that can be executed independent of the whole. By the phrase, "thread system information," logger 201 and/or small poller 203 may be configured to store thread use indicators, last update job names, last update timestamps, current file record counts, and/or current file thread start timestamp information. These will be discussed in further detail below.

For example, information from CAS 215, CAS sockets 213, CAS splitter 209, CAS merger 219, CAS formatter 207 and/or IFCK 205 may be sent to small poller 203 and/or logger 201 to facilitate processing transaction files. One or more threads may contain this information. As such, a transaction file may have a thread and a thread identifier associated with it. The thread identifier may identify a particular CAS socket 213a, 213b that will process the transaction file. A thread may also contain a type description. Logger 201 and/or small poller 203 may read the type description to facilitate logging and/or directing transaction files. That is, the thread type description may describe the transaction file size (i.e., small, medium, or large) associated with the thread.

Logger 201 and/or small poller 203 may also be configured to read/store a thread use indicator to identify whether a particular socket 213a, 213b is currently being used to process a transaction file. Logger 201 and/or small poller 203 may read/store the thread start timestamp to obtain information on the date and time the current transaction file started being processed by CAS 215 and/or a CAS thread. Logger 201 and/or small poller 203 may also be configured to read/store last update job name, the name of the batch job/common service routine that was executed to create the record and a last update timestamp, the date and time the current record was updated by CASF 200, 300, 400.

With continued reference to an exemplary embodiment illustrated in FIG. 2, small poller 203 may transmit files to CAS 215 using IFCK 205, CAS formatter 207 and/or CAS Splitter 209. IFCK 205 may be any hardware and/or software suitably configured to pre-edit the files coming into CAS 215. By pre-editing the files, IFCK 205 may be configured to ensure that the data files contain valid information, such as, for example, dates, format, debit card information, credit card information and/or dollar amounts. IFCK 205 may also be configured to ensure that the files are not corrupted, have been properly encrypted and/or decrypted, and/or conform to any other requirement.

CAS formatter 207 may be any hardware and/or software suitably configured to format files into commands that may be read by CAS 215. For example, CAS formatter 207 may be configured to format information from ABPP-readable records into CAS-readable records. In one embodiment, a CAS-readable record contains information such as a credit and/or debit card number, a dollar amount, a credit and/or debit card type, and/or billing information.

CAS splitter 209 may be any hardware and/or software suitably configured to break a file into multiple subsets (e.g., using advanced logic), to facilitate processing of the input file. CAS splitter 209 may then send the input file parts to CAS 215 for processing. For example, CAS splitter 209 may be configured to split the input file into as many as the number of sockets used for that stream. For a small stream, there may only be one socket 213 processing an input file at any time, therefore, CAS splitter 209 may not need to split the input file. In another embodiment, CAS splitter 209 may transmit the input file to CAS 215 for processing. However, as will be seen in detail below, CAS splitter 215 may be configured to split a stream into any number of input files (e.g., eight input files).

CAS merger 219 may be configured to merge and/or reconstruct as many input files as the number of sockets used for that stream. By the terms merge and reconstruct, CAS merger 219 may combine the authorized transactions from CAS 215 into one transaction file. For example, because small streams use only one socket, no merging needs to be done. However, as will be seen in detail below, CAS merger 219 may be configured to merge numerous input files (e.g., eight input files). CAS merger 219 may also facilitate forwarding one or more merged transaction files to one or more additional programs and/or systems for further processing.

Figure 3:
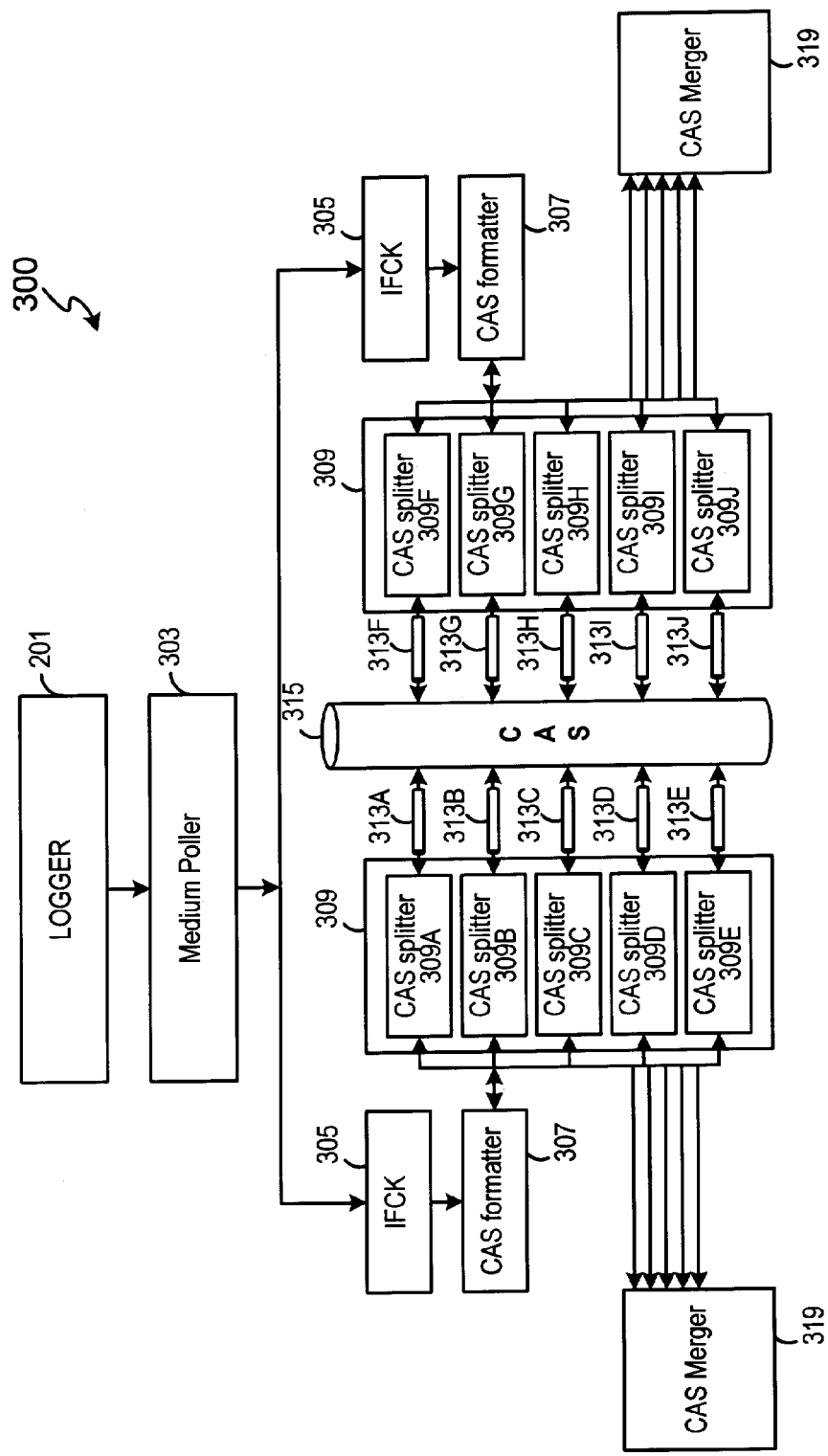
FIG. 3 includes a block diagram illustrating an exemplary authorization system for processing medium file streams.

FIG. 3 illustrates an exemplary embodiment of a medium CASF 300 in accordance with the present invention. Medium CASF 300 may be configured with at least one of logger 201 and/or medium poller 303 to facilitate directing medium file streams into CASF 300. Medium CASF 300 may also be configured with at least one of IFCK 305, CAS formatter 307, and/or CAS splitter 309 to facilitate editing, formatting and/or division of transaction files. Medium CASF 300 may be configured with one or more sockets 313. Sockets 313 may direct transactions to CAS 315 for authorization. Medium CASF 300 may also be configured with a CAS merger 319. CAS merger 319 may be used to facilitate reconstruction of authorized transaction files.

Medium CASF 300 may be configured with multiple (e.g., 10) sockets 313 to transmit files to CAS 315 for facilitating processing transactions. Transactions may originate through logger 201 and medium poller 303. Logger 201 may be configured to track transaction files and ensure that CASF 300 processes medium-sized files. Logger 201 may be configured in a manner similar to that described above. For example, logger 201 may be configured to ensure that CASF 300 processes transaction files containing 1000 to 49,999. Medium poller 303 may be configured to direct transaction files into the first-available CAS 315 to facilitate real-time authorizations. Medium poller 303 may be configured in a manner similar to small poller 203. For example, if three files, each containing 5000 transactions needs to be authorized, logger 201 may direct the files into CASF 300 because they are medium-sized files. Medium poller 303 may be configured to direct the files to CAS 315 for processing through two different socket 313 systems. If CAS 315 finishes processing the transactions from sockets 313A–313E before the transactions from sockets 313F–313J, medium poller 303 may direct the third transaction file to CAS 315 through sockets 313A–313E to facilitate immediate processing of the third set of transactions.

Logger 201 and/or medium poller 303 may also be configured to store factual reference information about each CAS 315 and/or CAS sockets 313. CAS sockets 313 may be configured similar to CAS socket 215. Each CAS 315 may be configured with multiple CAS sockets 313 to facilitate efficient and expeditious processing of transaction files. For example, as illustrated in FIG. 3, CAS 315 may be configured with a first socket system comprising five CAS sockets 313A–E, and a second socket system comprising five CAS sockets 313F–J. IFCK 307 may be configured to pre-edit the transaction files once medium poller 303 queues them for authorization. IFCK 307 may be configured like IFCK 309. For example, IFCK 307 may be configured to pre-edit a medium transaction file. After pre-editing is complete, CAS splitter 311 may be configured to split the transaction file into multiple (e.g., five in the example) sets of transactions. CAS splitter 311 may be configured in a manner similar to CAS splitter 211, however, because CASF 300 may be configured with CAS 315, containing two sets of five sockets 313, CAS splitter 311 may need to split one or more files. By the term split, CAS splitter 311 may divide a transaction file into multiple (e.g., five) equal and/or unequal sets of transactions. For example, if a transaction file contains 5000 transactions, CAS splitter 311 may split the file into five sets of 1000 transactions. CAS splitter 311 may then send each set of 1000 transactions to a different socket 313A–E. Sockets 313A–E may then transmit the subsets to CAS 315 for authorization.

Figure 4:
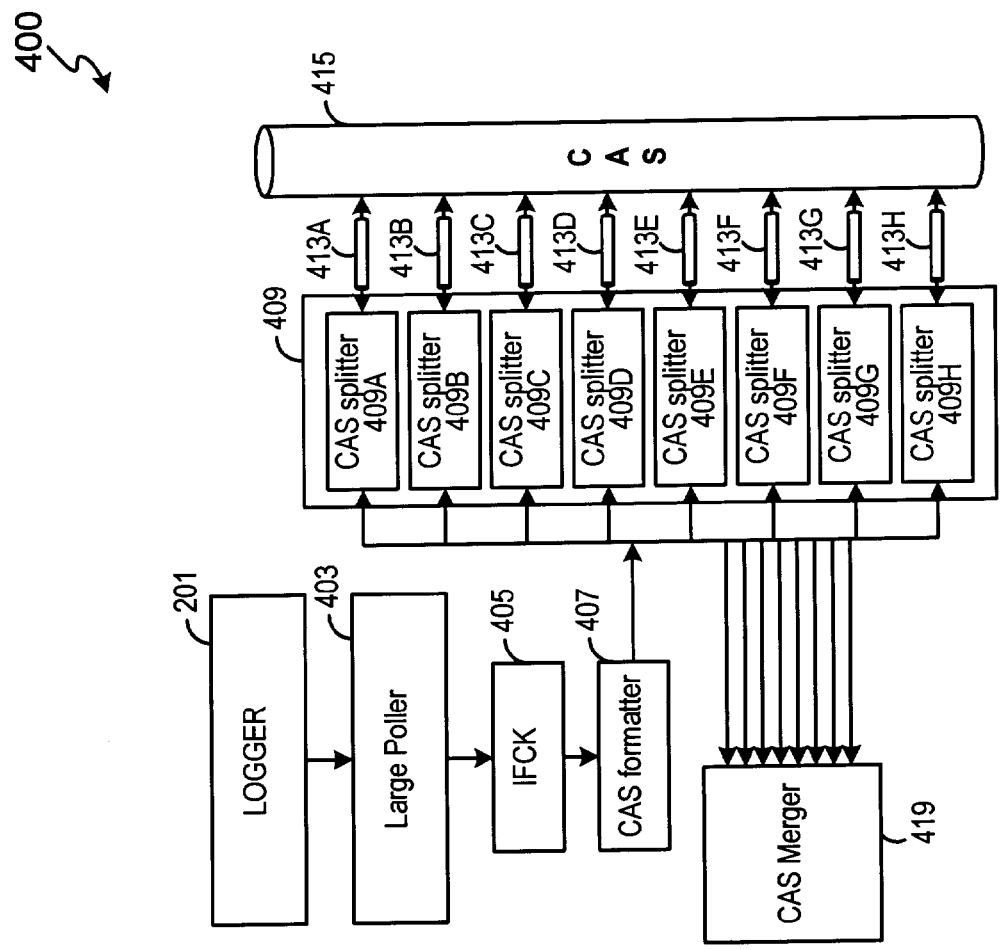
FIG. 4 includes a block diagram illustrating an exemplary authorization system for processing large file streams.

FIG. 4 illustrates an exemplary embodiment of a large CASF 400 in accordance with the present invention. Large CASF 400 may be configured with at least one of logger 201 and/or large poller 403 to facilitate directing large file streams into CASF 400. Large CASF 400 may also be configured with at least one of IFCK 405, CAS formatter 407, and/or CAS splitter 409 to facilitate editing, formatting and/or division of transaction files. Large CASF 400 may be configured with one or more sockets 413. Sockets 413 may direct transactions to CAS 315 authorization. Large CASF 400 may also be configured with a CAS merger 419. CAS merger 419 may be used to facilitate reconstruction of authorized transaction files.

In one embodiment, large CASF 400 may be configured with one eight-socket 413 CAS 415 to facilitate processing transactions. Transactions may originate through logger 201 and/or large poller 403. Logger 201 may be configured to track transaction files and ensure CASF 400 processes large transaction files. Logger 201 may be configured in a manner similar to that described above. For example, logger 201 may be configured to ensure that CASF 400 processes transaction files containing 50,000 or more transactions. Large poller 403 may be configured to direct transaction files into the first-available CAS 415 to facilitate real-time authorizations. Large poller 403 may be configured in a manner similar to small poller 203. For example, if two files, each containing 60,000 transactions need authorization, logger 201 may direct the files into CASF 400 because they are large-sized files. Large poller 403 may be configured to direct the files to CAS 415 for processing. Once CAS 415 finishes processing the first transaction file, large poller 403 may direct the second transaction file to CAS 415 to facilitate immediate processing of the second transaction file.

Logger 201 and/or large poller 403 may also be configured to store factual reference information about each CAS 415 and/or CAS sockets 413. CAS sockets 413 may be configured similar to CAS socket 215. Each CAS 415 may be configured with multiple (e.g. eight) CAS sockets 413 to facilitate efficient and expeditious processing of transaction files. For example, as illustrated in FIG. 4, CAS 415 may be configured with eight CAS sockets 413A–H. IFCK 407 may be configured to pre-edit the transaction files once large poller 403 queues them for authorization. IFCK 407 may be configured like IFCK 209. For example, IFCK may be configured to pre-edit a large transaction file. After pre-editing is complete, CAS splitter 411 may be configured to split the transaction file into eight sets of transactions. CAS splitter 411 may be configured in a manner similar to CAS splitter 211, however, because CASF 400 may be configured with CAS 415, containing eight sockets 413, CAS splitter 411 may need to split one or more files. By the term split, CAS splitter 411 may divide a transaction file into eight equal and/or unequal sets of transactions. For example, if a transaction file contains 60,000 transactions, CAS splitter 411 may split the file into eight sets of 7500 transactions. CAS splitter 411 may then send each set of 7500 transactions to a different socket 413A–H. Sockets 413A–H may then transmit the subsets to CAS 415 for authorization. If a transaction file contains 60,001 transactions, for example, CAS splitter 411 may be configured to split the file into seven sets of 7500 transactions and one set of 7501 transactions. In this way, each subset contains approximately the same number of transactions.

Figure 5:
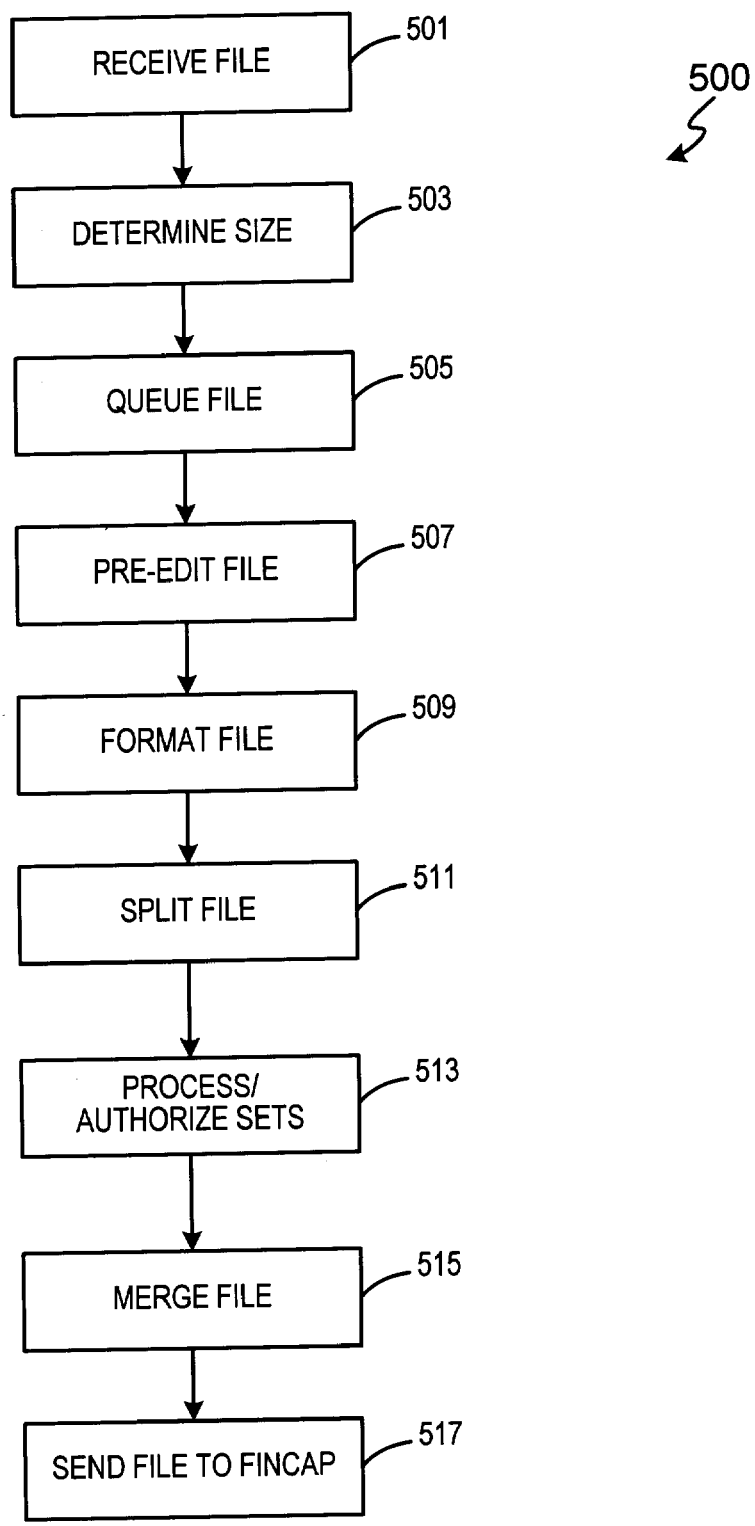
FIG. 5 includes a flowchart of an exemplary method of card authorization in accordance with the present invention.

An exemplary method for processing an authorization in accordance with the present invention is illustrated in FIG. 5. One or more transaction files may be received by CASF 200, 300, 400 (Step 501). Logger 201 may read information contained within the transaction files about number of transactions within the files to determine the size (Step 503) of the files. Depending on the number of transactions, the files may be routed to small poller 203, medium poller 303, or large poller 403. Small poller 203, medium poller 303, or large poller 403 may then queue the transaction files for processing (Step 505). Small poller 203, medium poller 303, or large poller 403 may queue on a substantially real-time, first come, first served, and/or batch basis. For first-come first served queuing, once one transaction file is processed, small poller 203, medium poller 303, or large poller 403 may immediately queue the next transaction file for authorization.

IFCK 205, 305, 405 may pre-edit the transaction files (Step 507) as described herein. CAS formatter 207, 307, 407 may then format the files (Step 509) in preparation for their authorization. By formatting, CAS formatter may reformat the transaction files into CAS-readable commands, as described herein. Upon formatting, CAS splitter 209, 309, 409 may be used to split the transaction files (Step 511) into subsets to facilitate expeditious processing.

CAS splitter 209, 309, 409 may split the transaction files into multiple (e.g., one, five or eight) different subsets or subsets. For example, CAS splitter 209 may be configured to split the transactions into one subset corresponding to single socket 213. CAS splitter 309 may be configured to split the transactions into five subsets corresponding to five sockets 313A–E. CAS splitter 409 may be configured to split the transactions into eight subsets corresponding to eight sockets 413A–H.

CAS 215, 315, 415 may then be used to process and/or authorize the subsets (Step 513) via respective sockets 213, 313, 413. By processing and/or authorizing the subsets, CAS 215, 315, 415 may read commands containing financial, credit, debit, and/or any other information relating to financial transactions, billing and/or transaction card companies. CAS 215, 315, 415 may compare the commands to information stored in one or more databases within ABPP 112 and/or CASF 200, 300, 400. If the command information is consistent and/or verifiable with the stored information, CAS 215, 315, 415 may authorize the transaction file or files and send them to CAS Merger 219. If the command information is inconsistent and/or non-verifiable with the stored information, CAS 215, 315, 415 may not authorize the transaction file and/or files and may either fail the transaction file and/or files or retry the authorization.

CAS 215, 315, 415 may also be configured to immediately begin processing the next queued transaction file once it has authorized and/or non-authorized the previous transaction file. Once CAS 215, 315, 415 completes processing and/or authorization of the subsets, CAS merger 219, 319, 419 may facilitate merger of the subsets into a transaction file (Step 515). The file may be then sent to FINCAP (Step 517) and/or any other program and/or system for further processing.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A system configured to facilitate authorizing billing transactions comprising:
    a poller configured for substantially real-time queuing of a billing transaction file;
    a splitter configured to split said billing transaction file into a subset;
    a Card Authorization System configured for authorizing said subset, said card authorization system configured with a socket; and
    a merger configured to reconstruct said subset into said billing transaction file.

2. The system of claim 1, wherein said splitter is configured to split said billing transaction file into at least one of one, five, and eight subsets.

3. The system of claim 1, wherein said system is configured to operate in substantially real time.

4. The system of claim 1, wherein said system is configured to operate on a first come, first served basis.

5. The system of claim 1, further comprising a logger configured to store factual reference information associated with a plurality of billing transaction file sizes.

6. The system of claim 1, further comprising a logger configured to store factual reference information associated with a plurality of billing transaction file sizes, wherein said logger is configured to recognize at least one of small, medium and large billing transaction file sizes.

7. The system of claim 1, wherein said system further comprises a formatter, wherein said formatter is configured to facilitate readability by said Card Authorization System of said billing transaction files.

8. The system of claim 1, wherein said billing transaction file includes a billing transaction.

9. A method for facilitating authorization of billing transactions, said method comprising the steps of:
    queuing a billing transaction file to facilitate authorization of said billing transaction file;
    splitting said billing transaction file into a subset;
    transferring said subset through a socket;
    authorizing said subset; and
    reconstructing said subset into said billing transaction file.

10. The method of claim 9, wherein said billing transaction file includes an automatic billing transaction.

11. The method of claim 9, wherein said step of transferring said subset through a socket further comprises transferring said subset through at least one of one socket, five sockets, and eight sockets.

12. The method of claim 9, wherein said step of splitting said billing transaction file comprises splitting said billing transaction file into at least one of one, five, and eight subsets.

13. The method of claim 9, wherein at least one of said steps of queuing, splitting, transferring, authorizing and reconstructing occur in substantially real-time.

14. The method of claim 9, wherein at least one of said steps of queuing, splitting, transferring, authorizing and reconstructing occur on a first come, first served basis.

15. The method of claim 9, further comprising logging a plurality of billing transaction file sizes.

16. The method of claim 9, further comprising logging a plurality of billing transaction file sizes to facilitate recognizing at least one of small, medium and large billing transaction file sizes.

17. The method of claim 9, further comprising formatting said billing transaction file to facilitate authorization of said billing transaction files.

* * * * *